United States Patent
Dice (10) Patent No.: US 8,046,758 B2
(45) Date of Patent: Oct. 25, 2011

(54) ADAPTIVE SPIN-THEN-BLOCK MUTUAL EXCLUSION IN MULTI-THREADED PROCESSING

(75) Inventor: David Dice, Foxborough, MA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 12/554,116

(22) Filed: Sep. 4, 2009

(65) Prior Publication Data

US 2009/0328053 A1   Dec. 31, 2009

Related U.S. Application Data (62) Division of application No. 10/861,729, filed on Jun. 4, 2004, now Pat. No. 7,594,234.

(51) Int. Cl.
*G06F 9/46* (2006.01)
(52) U.S. Cl. .......................... 718/100; 718/104; 718/108
(58) Field of Classification Search .................. None
See application file for complete search history.

(56) References Cited

U.S. PATENT DOCUMENTS

| | | |
|---|---|---|
| 3,984,820 A | 10/1976 | Stanley et al. |
| 4,908,750 A | 3/1990 | Jablow |
| 5,197,130 A | 3/1993 | Chen et al. |
| 5,228,131 A | 7/1993 | Ueda et al. |
| 5,438,677 A | 8/1995 | Adams et al. |
| 5,504,817 A | 4/1996 | Shamir |
| 5,555,370 A | 9/1996 | Li et al. |
| 5,611,063 A | 3/1997 | Loper et al. |
| 5,615,350 A | 3/1997 | Hesson et al. |
| 5,671,381 A | 9/1997 | Strasnick et al. |
| 5,765,206 A | 6/1998 | Hohensee et al. |
| 5,796,830 A | 8/1998 | Johnson et al. |
| 5,799,086 A | 8/1998 | Sudia |

(Continued)

FOREIGN PATENT DOCUMENTS

EP          1104900 A2 *   6/2001

OTHER PUBLICATIONS

Card, Stuart K., et al. "The WebBook and the Forager: an informational workspace for the World Wide Web," ACM Conference, 1996, pp. 111-117.

(Continued)

*Primary Examiner* — Meng An
*Assistant Examiner* — Caroline H Arcos
(74) *Attorney, Agent, or Firm* — Brooks Kushman P.C.

(57) ABSTRACT

Adaptive modifications of spinning and blocking behavior in spin-then-block mutual exclusion include limiting spinning time to no more than the duration of a context switch. Also, the frequency of spinning versus blocking is limited to a desired amount based on the success rate of recent spin attempts. As an alternative, spinning is bypassed if spinning is unlikely to be successful because the owner is not progressing toward releasing the shared resource, as might occur if the owner is blocked or spinning itself. In another aspect, the duration of spinning is generally limited, but longer spinning is permitted if no other threads are ready to utilize the processor. In another aspect, if the owner of a shared resource is ready to be executed, a thread attempting to acquire ownership performs a "directed yield" of the remainder of its processing quantum to the other thread, and execution of the acquiring thread is suspended.

19 Claims, 7 Drawing Sheets

U.S. PATENT DOCUMENTS

| | | | |
|---|---|---|---|
| 5,838,792 A | 11/1998 | Ganesan | |
| 5,892,828 A | 4/1999 | Perlman | |
| 5,898,850 A | 4/1999 | Dickol et al. | |
| 5,898,885 A | 4/1999 | Dickol et al. | |
| 5,905,895 A | 5/1999 | Halter | |
| 5,907,618 A | 5/1999 | Gennaro et al. | |
| 5,907,707 A | 5/1999 | Ramalingam et al. | |
| 5,913,065 A | 6/1999 | Faustini | |
| 5,937,066 A | 8/1999 | Gennaro et al. | |
| 5,943,496 A | 8/1999 | Li et al. | |
| 5,974,256 A | 10/1999 | Matthews et al. | |
| RE36,462 E | 12/1999 | Chang et al. | |
| 6,006,227 A | 12/1999 | Freeman et al. | |
| 6,011,918 A | 1/2000 | Cohen et al. | |
| 6,012,072 A | 1/2000 | Lucas et al. | |
| 6,052,699 A | 4/2000 | Huelsbergen et al. | |
| 6,070,010 A | 5/2000 | Keenleyside et al. | |
| 6,074,432 A | 6/2000 | Guccione | |
| 6,075,942 A | 6/2000 | Cartwright, Jr. | |
| 6,081,665 A | 6/2000 | Nilsen et al. | |
| 6,086,623 A | 7/2000 | Broome et al. | |
| 6,105,102 A | 8/2000 | Williams et al. | |
| 6,106,571 A | 8/2000 | Maxwell | |
| 6,131,187 A | 10/2000 | Chow et al. | |
| 6,141,794 A | 10/2000 | Dice et al. | |
| 6,151,703 A | 11/2000 | Crelier | |
| 6,158,048 A | 12/2000 | Lueh et al. | |
| 6,182,274 B1 | 1/2001 | Lau | |
| 6,253,215 B1 | 6/2001 | Agesen et al. | |
| 6,253,218 B1 | 6/2001 | Aoki et al. | |
| 6,289,451 B1 | 9/2001 | Dice | |
| 6,304,949 B1 | 10/2001 | Houlsdworth | |
| 6,308,315 B1 | 10/2001 | Dice et al. | |
| 6,327,701 B2 | 12/2001 | Ungar | |
| 6,345,287 B1 | 2/2002 | Fong et al. | |
| 6,430,670 B1 | 8/2002 | Bryg et al. | |
| 6,438,673 B1 | 8/2002 | Jourdan et al. | |
| 6,467,007 B1 | 10/2002 | Armstrong et al. | |
| 6,480,918 B1 | 11/2002 | McKenney et al. | |
| 6,510,437 B1 | 1/2003 | Bak et al. | |
| 6,530,017 B1 | 3/2003 | Dice et al. | |
| 6,658,652 B1 | 12/2003 | Alexander, III et al. | |
| 6,677,962 B1 | 1/2004 | Bailey | |
| 6,687,904 B1 | 2/2004 | Gomes et al. | |
| 6,697,834 B1 | 2/2004 | Dice | |
| 6,799,236 B1 | 9/2004 | Dice et al. | |
| 6,854,048 B1 | 2/2005 | Dice | |
| 6,862,674 B2 | 3/2005 | Dice et al. | |
| 6,877,088 B2 | 4/2005 | Dice | |
| 6,883,026 B1 | 4/2005 | Onodera et al. | |
| 6,988,110 B2 | 1/2006 | Boyd et al. | |
| 7,234,143 B2 | 6/2007 | Venkatasubramanian | |
| 2001/0020956 A1 | 9/2001 | Moir | |
| 2001/0042189 A1 | 11/2001 | Babaian et al. | |
| 2001/0047382 A1 | 11/2001 | Sachedina et al. | |
| 2002/0078121 A1 | 6/2002 | Ballantyne | |
| 2002/0138544 A1 | 9/2002 | Long | |
| 2002/0143847 A1* | 10/2002 | Smith | 709/103 |
| 2002/0147758 A1 | 10/2002 | Lee | |
| 2003/0023656 A1 | 1/2003 | Hutchison et al. | |
| 2003/0037117 A1* | 2/2003 | Tabuchi | 709/207 |
| 2003/0158885 A1 | 8/2003 | Sager | |
| 2003/0182356 A1 | 9/2003 | Limoges et al. | |
| 2003/0200457 A1* | 10/2003 | Auslander et al. | 713/200 |
| 2003/0236816 A1 | 12/2003 | Venkatasubramanian | |
| 2004/0015971 A1 | 1/2004 | Spoltore et al. | |
| 2004/0054997 A1 | 3/2004 | Katragadda et al. | |
| 2004/0055003 A1 | 3/2004 | Sundaram et al. | |
| 2004/0117791 A1 | 6/2004 | Prasad et al. | |
| 2005/0039181 A1 | 2/2005 | Togawa | |
| 2005/0081204 A1* | 4/2005 | Schopp | 718/100 |
| 2005/0203904 A1 | 9/2005 | Mehaffy et al. | |
| 2007/0022423 A1 | 1/2007 | Bril et al. | |

OTHER PUBLICATIONS

Bershad, Brian N. et al., "Fast Mutual Exclusion for Uniprocessors," ACM Sigplan Notices: vol. 27, Issue 9, (Sep. 1992), pp. 222-233.

Newhall, Tia, et al., "Performance Measurement of Dynamically Complied Java Executions," JAVA ACM, 1999, pp. 42-50.

Ishizaki, kazuaki, et al., "Design, Implementation, and Evaluation of Optimizations in a Just-In-Time Compiler," JAVA ACM, 1999, pp. 119-128.

Chang, Chi-Chao, et al., "Interfacing Java to the Virtual Interface Architecture," JAVA ACM, 1999, pp. 51-57.

Slye, J.H., et al. "Support for software interrupts in log-based rollback-recovery," IEEE, Oct. 1998, vol. 47, Issue: 10, (Abstract Only).

Barua, S., "Computer-based multimedia system on computer organization and design," IEEE, Oct. 1997, (Abstract only).

Shen et al. (adaptive two level thread management for fast MPI execution on shared memory machines ACM, 1999, pp. 1-19.

Levine et al. ("Measuring OS Support for Real time Cobra ORBs," IEEE, 1999, pp. 1-9).

Ji et al. ("Performance measurements for multithreaded programs," ACM, 1998, pp. 161-170).

\* cited by examiner

ADAPTIVE SPIN-THEN-BLOCK MUTUAL EXCLUSION IN MULTI-THREADED PROCESSING

CROSS-REFERENCE TO RELATED APPLICATIONS

This application is a division of U.S. application Ser. No. 10/861,729, filed on Jun. 4, 2004 and now U.S. Pat. No. 7,594,234, issued on Sep. 22, 2009.

BACKGROUND OF THE INVENTION

1. Field of the Invention

In a multiprocessor environment with threads and preemptive scheduling, threads generally participate in a mutual exclusion protocol for synchronization purposes, for example to ensure that only one thread has access to a shared resource (e.g., critical sections of memory) at a given time. Mutual exclusion protocols employ lock constructs (also referred to as "mutex" constructs) in which a lock is either in unlocked state or in a locked state, in which case a single thread is said to "own" the lock. The lock owner is permitted to access the shared resource protected by the lock. If another thread attempts to obtain ownership of a lock while the lock is owned, the other thread will not be permitted to access the shared resource until the lock owner releases the lock and the other thread successfully acquires ownership of the lock.

2. Background Art

Typically, a lock object contains an owner field that identifies the thread that owns the lock. When the owner field is NULL the lock is unowned. In some implementations, the lock object may also include a queue that identifies "blocked" threads, which are threads whose execution has been suspended while they are waiting to acquire the lock. Commonly, a thread attempts to gain ownership of a lock by using a test-and-set type of instruction (such as CAS (compare-and-swap) in SPARC®, CMPXCHG on Intel's IA32 processor) which atomically replaces a NULL value in the owner field with an identifier of the acquiring thread. The replacement only occurs if the owner field is found to be NULL during the compare part of the instruction. If the instruction succeeds, the acquiring thread is then said to own or hold the lock. If the instruction fails, i.e., the owner field is found to be non-NULL then the acquiring thread is not permitted to access the shared resource. In this case the acquiring thread generally takes one of three actions: (1) spin, (2) block, or (3) sleep/yield. Each of is discussed in turn below.

When an acquiring thread spins, it executes a loop of instructions in which the owner field of the lock is periodically polled, waiting for the thread owner to release the lock. If the spinning thread observes a NULL value in the owner field, the thread executes a test-and-set instruction to try to gain ownership of the lock. If the instruction succeeds, the thread becomes the owner and is permitted to access the shared resource. If the instruction fails, the thread continues spinning. Generally, the thread can perform no useful work when it is spinning, and therefore makes no progress in its computational tasks. Spinning is sometimes referred to as "busy waiting".

When an acquiring thread blocks, its execution is suspended indefinitely by the operating system 32—it becomes ineligible for dispatch onto a processor by a scheduler within the operating system 32. The scheduler selects and dispatches another thread. The thread that is currently the lock owner will normally be dispatched at some point, in which case it will release the lock as part of its execution. When the lock owner eventually releases the lock, it "wakes" the thread from its blocked status. This causes the status of the blocked thread to change to "runnable", meaning it becomes eligible for dispatch onto a processor, whereupon it can again compete for ownership of the lock.

When a thread blocks, the processor becomes idle if no ready threads are available. Additionally, blocking generally results in a context switch, which consumes processing cycles and can interfere with efficient operation of a processor's memory address translation and data caching mechanisms.

There are hybrid "spin-block" or spin-then-block implementations that spin for some period and then revert to blocking. The synchronization subsystems in various Java® Virtual Machine (VM) implementations use a spin-block strategy. Sleeping and yielding are both implemented with calls to the operating system's scheduler. The acquiring thread can sleep, which temporarily blocks the thread for some short interval. During this interval, other threads may run on the processor. Yielding requests that the scheduler check its ready queues, and if any other threads are ready the scheduler suspends execution of the yielding thread and immediately dispatches one of the ready threads. If no ready threads exist, the yield operation returns immediately and the acquiring thread continues executing. Both sleeping and yielding generally result in a context switch.

SUMMARY OF THE INVENTION

The above mechanisms for acquiring a lock can be wasteful of processing resources in a computer system, and thus lead to inefficient system operation. Spinning is wasteful, for example, because a spinning thread consumes processor cycles that might have otherwise been used by other threads to perform useful work. Blocking can also be wasteful, because it incurs a context switch operation that can require hundreds of machine cycles. Context switching, like spinning, performs no useful work. In addition, after a context switch the incoming thread often accesses memory locations that are quite different from those accessed by the outgoing thread, so that translation buffer misses and data cache misses are incurred. When the outgoing thread is eventually made ready and dispatched, it is unlikely that any of its translation buffer entries or data cache lines remain in the processor, so the thread incurs a "cache reload transient" delay penalty as it resumes operation.

Thus a system and method are disclosed that employs certain adaptive modifications of spinning and blocking behavior in a multi-threaded environment to improve operational efficiency.

Because spinning for longer than a context switch, even if successful, is not profitable, in one aspect spinning time is limited to no more than a context switch. More specifically, a computerized system and a computer-implemented method of acquiring ownership of a shared resource are disclosed. The duration of a context switching operation within the computing environment is measured, such as by using a pair of threads that alternately awaken each other, measuring the total elapsed time of the two context switches involved in the procedure, and dividing the result by two. A spin procedure is initially executed as part of an attempt by a first thread to acquire ownership of the shared resource. The spin procedure ends upon either successfully obtaining ownership of the shared resource, or reaching a predetermined execution time limit, whereupon the spinning thread blocks. The execution time limit for spinning is set equal to the measured duration of a context switching operation, and thus spinning is accordingly limited.

In another aspect, the computerized system and computer-implemented method limit the frequency with which spinning is employed as an alternative to blocking, a strategy that can be especially useful for highly contended shared resources. The technique is based on sets of N successive attempts by a first thread to acquire ownership of the shared resource. For a predetermined number M (such as one) of the attempts of a set, a spin procedure is executed during which the first thread repeatedly determines whether the shared resource is owned by another thread. The spin procedure ends upon either successfully obtaining ownership of the shared resource, or reaching a predetermined execution time limit, whereupon the spinning thread blocks. For the remainder of the N attempts of each set, it is determined whether the shared resource is owned by another thread, and if so then a blocking procedure is executed which temporarily suspends execution of the first thread—no spinning is employed during these attempts. The value of N is periodically decreased if at least one recent execution of the spin procedure has terminated successfully, and is increased if the execution of the spin procedure has terminated unsuccessfully. Thus, spinning is utilized only M out of N times, and the value of N is adaptively adjusted so that the frequency of spinning is higher when spinning is more likely to be successful (as indicated by recent success) and lower when spinning is less likely to be successful. In another aspect, the computerized system and computer-implemented method obtain information about the execution status of the current owner of a lock, and bypass spinning if the status indicates that spinning is unlikely to be successful. Specifically, the execution status of the other thread is examined to determine whether it indicates that the other thread is not progressing toward releasing its ownership of the shared resource. This might be the case, for example, if the other thread is blocked for some reason, or itself is spinning in an attempt to acquire another lock. If the execution status indicates that the other thread is progressing toward releasing the shared resource, then the first thread is permitted to spin in an attempt to acquire ownership of the shared resource. However, if the execution status indicates that the other thread is not progressing toward releasing the shared resource, then a blocking procedure is executed which temporarily suspends execution of the first thread, thus avoiding spinning that is unlikely to be successful.

In another aspect, the computerized system and computer-implemented method operate in response to whether other threads are ready to execute. If so, then the duration of spinning is limited, for example to the duration of a context switch. However, if no other threads are ready, then spinning is permitted for longer than the duration of a context switch. Because no other threads are ready to utilize the processor, longer spinning does not adversely affect operating efficiency.

In another aspect, the computerized system and computer-implemented method operate in response to whether another thread, which is currently the lock owner, is ready to execute. This technique is especially useful in the ease of "priority inversion", in which a higher-priority thread is stuck waiting for a lower-priority (and therefore slower-executing) thread to release a lock. If the execution status of the other thread indicates that the other thread is ready to be executed, the acquiring thread performs a "directed yield" operation in which the remainder of the processing quantum allocated to the acquiring thread is yielded to the other thread, and execution of the acquiring thread is suspended. Generally, the other thread will be able to make progress in the time yielded to it, so that the acquiring thread is likely to incur less overall delay in obtaining the lock than in the absence of the directed yield operation. Directed yield operations also tend to keep cache lines associated with a lock and the data protected by a lock in one processor's cache, reducing the occurrence of cache misses and cache line migration from one processor to another in multi-processor systems.

Other features and advantages of the present invention will be appreciated from the Detailed Description below.

DETAILED DESCRIPTION OF THE PREFERRED EMBODIMENT(S)

Figure 1:
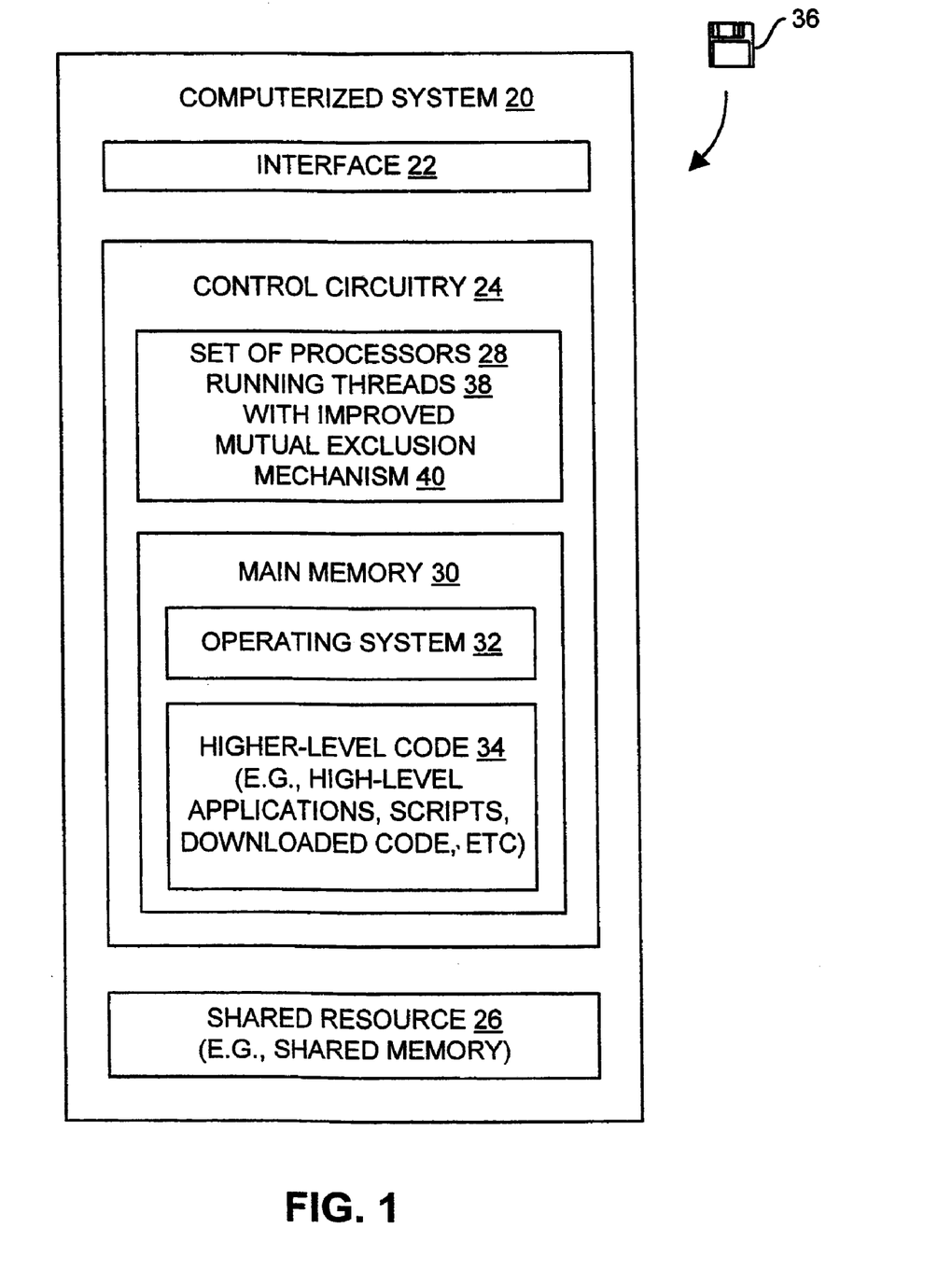
FIG. 1 is a block diagram of a computer system in accordance with the present invention.

FIG. 1 shows a computerized system 20 which includes an interface 22, control circuitry 24, and a shared resource 26. The interface 22 is configured to provide external access to the computerized system 20 (e.g., for a user, for communications with an external device, etc.). The shared resource 26 is a computerized resource of the system 20 which is sharable in a common manner among multiple computerized entities, e.g., threads, processes, processors, clients, etc. The control circuitry 24 operates as a controller of the computerized system 20 to perform certain programmed operations, e.g., to operate the computerized system 20 as a general purpose computer for one or more users, a host, a client or server, a data storage system, a data 25 communications device, a compute engine, etc.

As shown in FIG. 1, the control circuitry 24 includes a set of one or more processors 28 and main memory 30 coupled to the set of processors 28. The main memory 30 stores a variety of memory constructs including an operating system 32 and higher level code 34 (e.g., high-level applications, scripts, downloaded code, etc.). In some arrangements, the operating system 32 and the higher level code 34 are loaded into the main memory 30 through the interface 22 from computerized media 36 (e.g., CD-ROM diskettes, magnetic tape, propagated signals during network downloads, combinations thereof, and the like). In operation of the computerized system 20, the collection of the various elements as shown in FIG. 1 is sometimes referred to as an "operating environment."

By way of example only, the shared resource 26 is sharable memory which is accessible by multiple threads or processes (hereinafter referred to as simply threads) running on the set of processors 28. Shared memory is typically used in symmetric-multiprocessor "SMP" systems for coordinating access to "critical" code sections, i.e., code sections that can only be executed by one process at a time. Other suitable sharable resources 26 include logical devices, physical devices, and the like. It should be understood that the main memory 30 is capable of being formed from a combination of volatile memory (e.g., semiconductor memory) and non-volatile memory (e.g., disk drives), and that shared memory is capable of residing in a contiguous or integrated manner with the main memory 30 (e.g., on one or more memory circuit boards containing semiconductor memory).

As explained in further detail below, the threads 38 are capable of simultaneously running on the control circuitry 24 and are configured to access the shared resource 26. It is to be understood that "simultaneously running" as used herein includes threads running concurrently on different processors as well as preemptible threads 38 in a multi-tasking environment on a single CPU. Although only one such thread 38 is actually executing instructions on the CPU at a given instant, they each receive respective "quanta" or units of processing time on the CPU in a time-multiplexed fashion, and thus at the system level are seen to be running simultaneously. Although the disclosed techniques are applicable to such single-CPU kinds of multi-tasking, it is noted that spinning is generally of limited use in such embodiments, and therefore as a practical matter the disclosed techniques are more generally applicable to true multiprocessor systems.

The mutual exclusion mechanism 40 satisfies the need for the processors 28 to guarantee that, when the multiple threads 38 are running in parallel, each thread 38 accurately views operations of the other threads 38 in correct order, thus enabling the system 20 to enjoy certain optimizations (e.g., processor design optimizations, interconnect optimizations, etc.) which offer the potential to improve overall system performance. In particular, the mutual exclusion mechanism 40 provides for mutual exclusion among two or more threads 38 with respect to the shared resource 26. The shared resource 26 is said to be either "unowned," or "owned" by at most one of the threads 38, which is the current "owner" of the shared resource 26. Typically, the identity of the current owner (which may be "null" in the case of no owner) is included in a data element forming part of the mutual exclusion mechanism 40 that is directly manipulated by the threads 38 in connection with the synchronization-related aspects of their operations. Such a data element is commonly referred to as a "lock", and that terminology is utilized herein.

As is known to those skilled in the art, synchronization mechanisms generally include respective elements at the hardware level, in the processor instruction set, in the operating system 32, and in the high-level programming languages in which the source code for the threads 38 is written. Examples of suitable processors architectures for the processors 28 that provide such elements include the SPARC® Architecture and the Intel IA32® Architecture. Further examples of a suitable execution environment include the Java® Virtual Machine, which provides for synchronization among multiple threads 38 of Java code executing simultaneously on a computer system.

The following description of different aspects of interthread synchronization 20 focuses primarily on the operation of one of the threads 38 contending for ownership of the shared resource 26. It will be understood that in each case there are other contending threads 38. Where applicable, pertinent aspects of the operation of these other threads 38 is included, but it is generally assumed only that the other threads 38 employ well-understood techniques for operating on the synchronization locks in contending for access to the shared resource 26.

Figure 2:
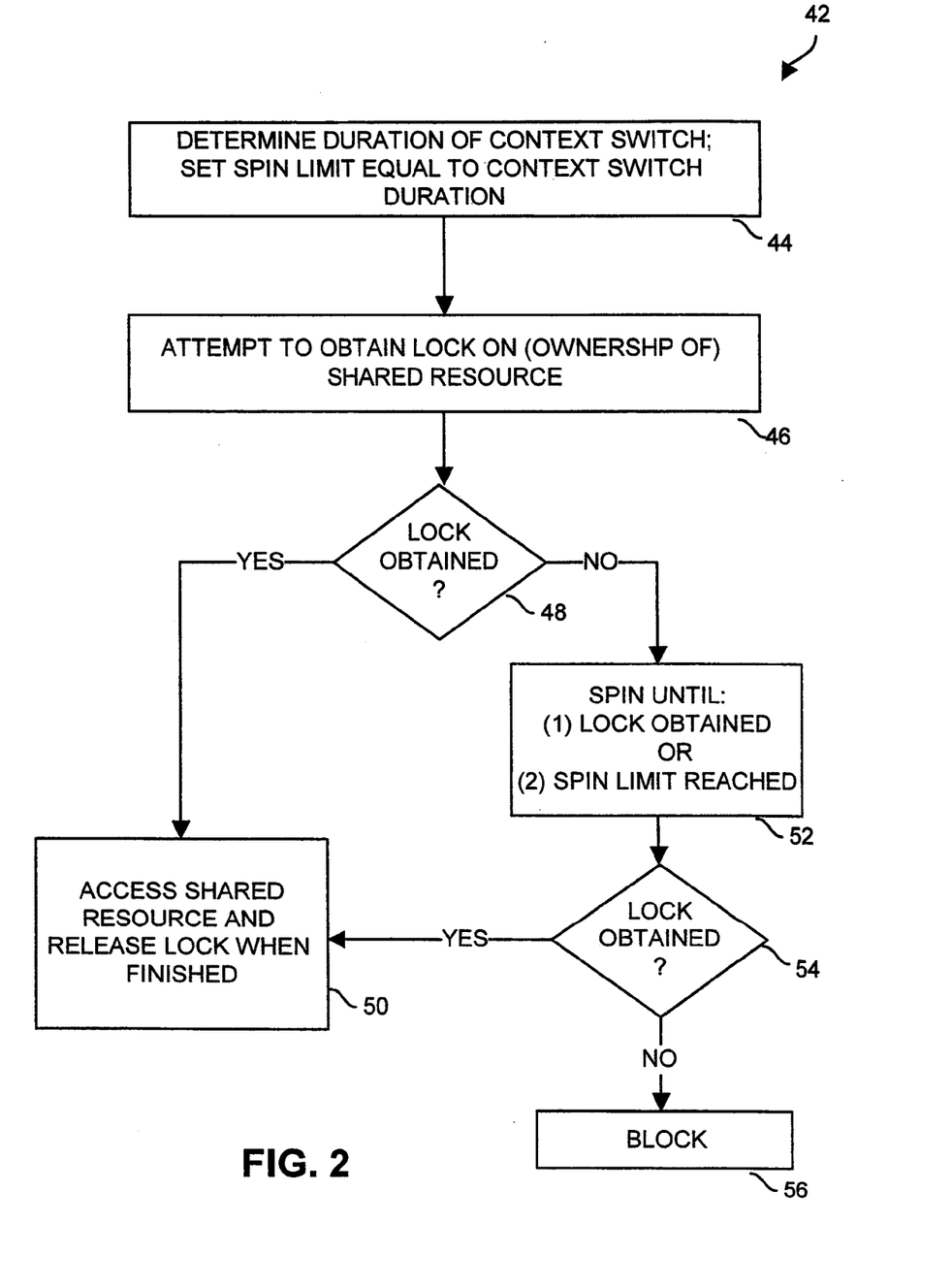
FIGS. 2-7 are flow diagrams of different aspects of adaptive spin-then-block mutual exclusion operation of a computer system such as the system of FIG. 1.

FIG. 2 shows a first aspect of operation of the threads 38 pertaining to interthread synchronization. Generally, the procedure of FIG. 2, which is referred to by reference number 42, constitutes a "spin-then-block" procedure for attempting to acquire ownership of the shared resource, including an improvement tending to promote 30 greater efficiency in system operation. In particular, in an initial calibrating step 44, the duration of a context switch during operation of the computerized system 20 is measured, and a SPIN LIMIT value is set equal to the measured duration. The measurement can be accomplished, for example, by employing two co-operating threads 38, one of which is executing and one of which has its execution suspended. The executing thread 38 marks the initial time, requests that the operating system 32 5 "wake up" the other thread 38, and then "sleeps", i.e., suspends its own execution. Upon waking up, the second thread 38 requests that the operating system 32 wake up the first thread 38. When the first thread 38 wakes up, it notes the time again as a finish time. Because the overall procedure has involved two context switches (first-to-second followed by second-to-first), the context switch duration is calculated by subtracting the initial time from the finish time and dividing the result by two. It will be appreciated by those skilled in the art that a representative context switch duration may alternatively be calculated as a minimum over multiple context switches, which may include context switches among a variety of threads 38 executing in the computerized system 20. The calculated value should accurately represent the duration of a context switch during operation of the computerized system 20.

The SPIN LIMIT value is preferably expressed as a number of iterations of a spin loop executed by the threads 38 as part of their synchronization operation. In this manner, the SPIN LIMIT automatically adapts to compensate for a variety of variables that influence the duration of a context switch as measured in absolute time, such 20 variables including processor type, clock rate, memory speed, etc. Thus, the duration of a single iteration of the spin loop is determined, and this value is used in conjunction with the measured context switch duration to establish the SPIN limit in terms of a maximum number of iterations of the spin loop. It will be understood that SPIN LIMIT is an environment variable usable by all threads 38.

In step 46 of FIG. 2, a thread 38 attempts to acquire ownership of the shared resource 26, for example by reading the lock data element (i.e., a location in the memory 30 indicating an ownership state of the shared resource 26) and ascertaining whether the owner field has a null value. If so, the thread 38 then attempts a test-and-set type of instruction that will atomically read the lock, determine whether the owner field still has a null value, and if so then set the owner field to the ID of the thread 38, thus establishing the thread 38 as the owner. This result is shown as the YES fork of step 48 in FIG. 2. In this case, the thread 38 proceeds to access the shared resource and eventually release the lock in step 50.

If in step 48 the lock is not successfully obtained, which is shown as the NO fork of step 48, then the thread 38 executes a spin procedure at step 52. The thread 38 repeatedly executes a loop in which the same reading and test-and-set operations described above are executed. If the thread 38 successfully acquires the lock in any of these operations, shown as the YES fork of step 54, it proceeds to access the shared resource 26 and eventually release the lock in step 50. The looping of step 52 also includes a test whether the spin procedure has been given a desired amount of time to acquire the lock, which is represented by the SPIN LIMIT value established in step 44. If step 52 terminates due to the SPIN LIMIT having been reached (which is shown as the NO fork of step 54), then the thread 38 proceeds to step 56 in which it "blocks", or suspends its execution. Typically, the thread 38 is re-activated, or "awakened," by the operating system 32 at a later time when the lock is released by another thread 38.

Figure 3:
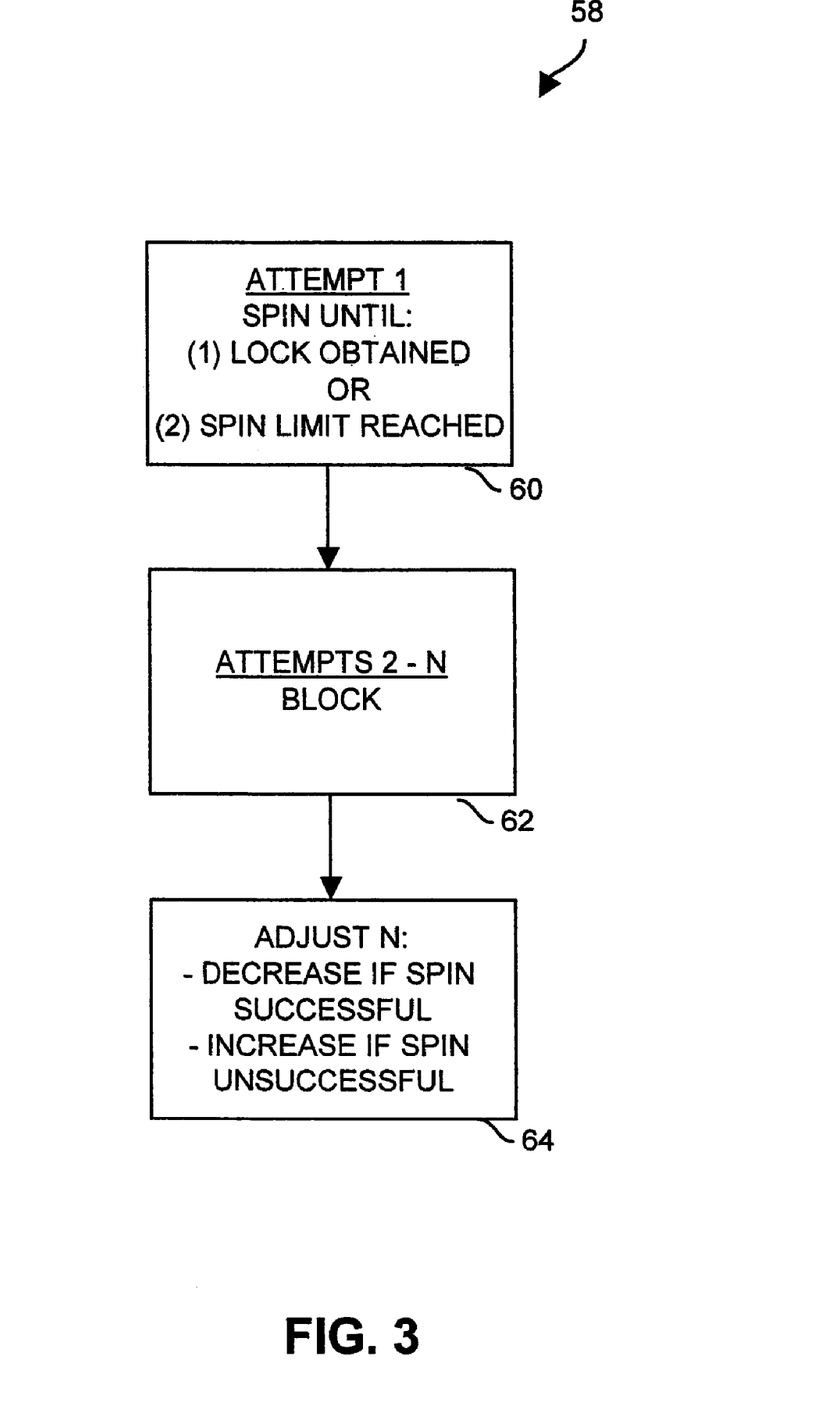

In the procedure of FIG. 2, the calibration step 44 can be performed "on the fly" at the beginning of execution of the threads 38 that will be contending for the shared resource 26. Alternatively, it can be performed in a more static manner, such as immediately preceding the startup of the Java VM or similar run-time environment. FIG. 3 shows a second aspect of operation of a thread 38 pertaining to interthread synchronization, generally identified by reference number 58. The procedure of FIG. 3 can be used to advantage in connection with a shared resource 26 that is subject to a large amount of contention, such that on average the time required to obtain a lock is much larger than the average context switch time. In such cases, it is generally disadvantageous to employ spinning, and thus the procedure automatically adjusts the relative frequency of spinning as opposed to blocking to obtain efficient system operation.

The procedure 58 employs a variable N that is initially a preset value defined, for example, when the system 20 is initially configured for operation. The initial value of N may be set to ten or one hundred, for example. The exact value can be established based on an understanding of the function of this value in the procedure 58 as described below. The value of N is specific to a given lock.

In step 60, the thread 38 makes a first attempt to obtain ownership of the shared resource 26 by executing a spin procedure such as described above with reference to FIG. 2. If the lock is obtained, the thread 38 then accesses the shared resource 26 and eventually releases the lock. The duration of spinning is limited to a predetermined limit, such as the duration of a context switch as described with reference to FIG. 2 above.

In step 62, the thread 38 makes subsequent attempts to acquire the lock. For each of these attempts, however, if the lock is not obtained, then the thread 38 blocks rather than spins. Each time the thread 38 blocks, it is subsequently awakened in the manner described above with reference to FIG. 2. Upon being awakened, the thread 38 again attempts to acquire the lock, and if successful accesses the shared resource 26. The blocking and awakening occurs for attempts 2 through N of each N attempts to acquire the lock.

At step 64, the value of N is conditionally adjusted depending on whether attempt number 1 to acquire the lock by spinning was successful. If so, the value of N is decreased, and if not, the value of N is increased. This adjustment has the effect of adjusting the frequency with which spinning rather than blocking is used to obtain the lock, this frequency being roughly equal to 1/(N−1). If spinning is successful, then it generally preferred to employ spinning, and thus the frequency is increased by decreasing N. If spinning is unsuccessful, the frequency is decreased by increasing N. The new value of N is used in the next iteration of the procedure 68.

In the illustrated embodiment, N is generally constrained to be no less than two. It is desirable to have an upper bound on N as well, so that even under extreme operating conditions, an attempt at spinning is made at least occasionally. This upper limit can be quite high, such as on the order of one hundred thousand, although a lower limit may be more practical in many embodiments. The exact value of the upper limit is an operating parameter that can be established during the design or configuration of a system, as well as during operation. Higher values of N tend to result in slower adaptation to dynamic changes in the contention for the lock, whereas excessively low values may not provide for a desirably low frequency of spinning.

It will be appreciated that FIG. 3 illustrates only one set of N out of a stream of attempts to acquire a lock. Thus, the procedure of FIG. 3 is essentially repeated indefinitely. It is not necessary to adjust N after each set of N attempts, as illustrated in FIG. 3, although such an approach may serve as one convenient method. In alternative embodiments N, may be adjusted after some multiple of N attempts, or it may be adjusted according to some other scheduling criteria. Additionally, the adjustment need not be based on the success or failure of only the most recent spinning. It may be desirable to look at a longer recent history, such as the last two or more spinning attempts. Generally, it is desirable that N be adjusted such that an optimal ratio of spinning to blocking is utilized in the system.

Additionally, although FIG. 3 depicts a "1-of-N" use of spinning, alternative embodiments may employ a more general "M-of-N" measure of frequency, where M represents the number of attempts that employ spinning out of N successive attempts to acquire a lock. Also, the amount by which N is incremented and decremented may be a value other than 1.

It may be desirable to adjust the value of N adaptively. N might vary over the execution of a program for a variety of reasons. For example, the application program may change its behavior such that the lock is held for longer or shorter times on average. Variations in the system load may also call for changes in the value of N. As the system becomes more saturated and the kernel's ready queues become longer, the chances that a lock holder is running (versus ready) are decreased. As a result, spin attempts have less chance of being successful, and N will increase. Additionally, the number of threads competing for the lock might increase, such that the odds of one spinner successfully grabbing the lock in the spin interval goes down.

Figure 4:
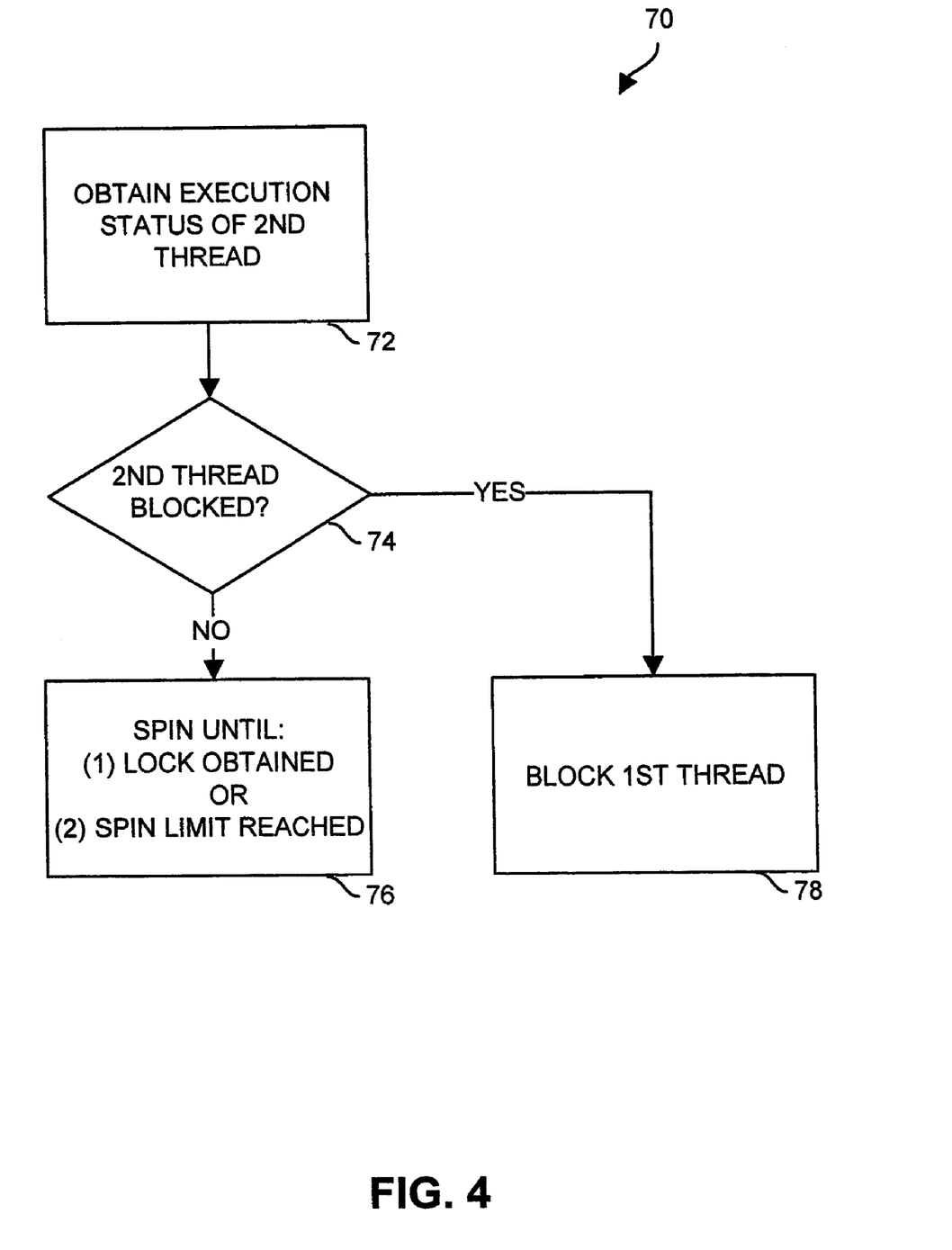

FIG. 4 shows a third aspect of operation of a thread 38 pertaining to interthread synchronization in the context of coordinating access to the shared resource 26, generally identified by reference number 70. The illustrated procedure has the advantage of avoiding "futile" spinning due to lack of progress by the lock owner, which can occur in contexts such as the following. Consider the case in which a first thread is attempting to acquire a first lock that is currently owned by a second thread, while the second thread is attempting to acquire ownership of a second lock owned by a third thread. Such operational conditions are commonly encountered.

In such a scenario, futile spinning can occur when second thread 38 that owns the first lock is blocked waiting to obtain the second lock. In this case, the second thread 38 is unlikely to release the lock any time soon, and thus it is futile for the first thread 38 to spin. In the illustrated procedure, each thread 38 has access to information indicating the execution status of other threads 38 contending for the same lock. This information may be made available to the thread 38 according to various techniques. For example, lock data structures in the Java VM have a pointer that not only identifies the owner of the lock, but the execution status of the owner as well. A thread 38 examining a lock can examine this execution status information.

In step 72 the thread 38 attempting to acquire a lock reads the lock data and obtains the identity and execution status of the owner. In FIG. 4, the acquiring thread 38 and the current owner thread 38 are referred to as the first and second threads 38, respectively, In step 74, the first thread 38 determines if the owner field is non-null, indicating that the lock is owned by the second thread 38, and further examines the execution status of the owner. The owner may itself be blocked, for example waiting for an input/output operation to complete. If not, the first thread 38 proceeds to step 76 in which the first thread 38 executes a spinning procedure until it either obtains the lock or reaches a predetermined spin limit, such as described above with reference to FIG. 2. However, if in step 74 the second thread 38 is determined to be blocked, then the first thread 38 blocks immediately in step 76, on the assumption that the blocked status of the second thread 38 indicates that the lock is unlikely to be released soon. This makes the processor available for other threads 38 that may be able to make progress, thus promoting system efficiency. As described above, the first thread 38 will eventually be awakened by the operating system 32 and attempt again to acquire the lock.

Figure 5:
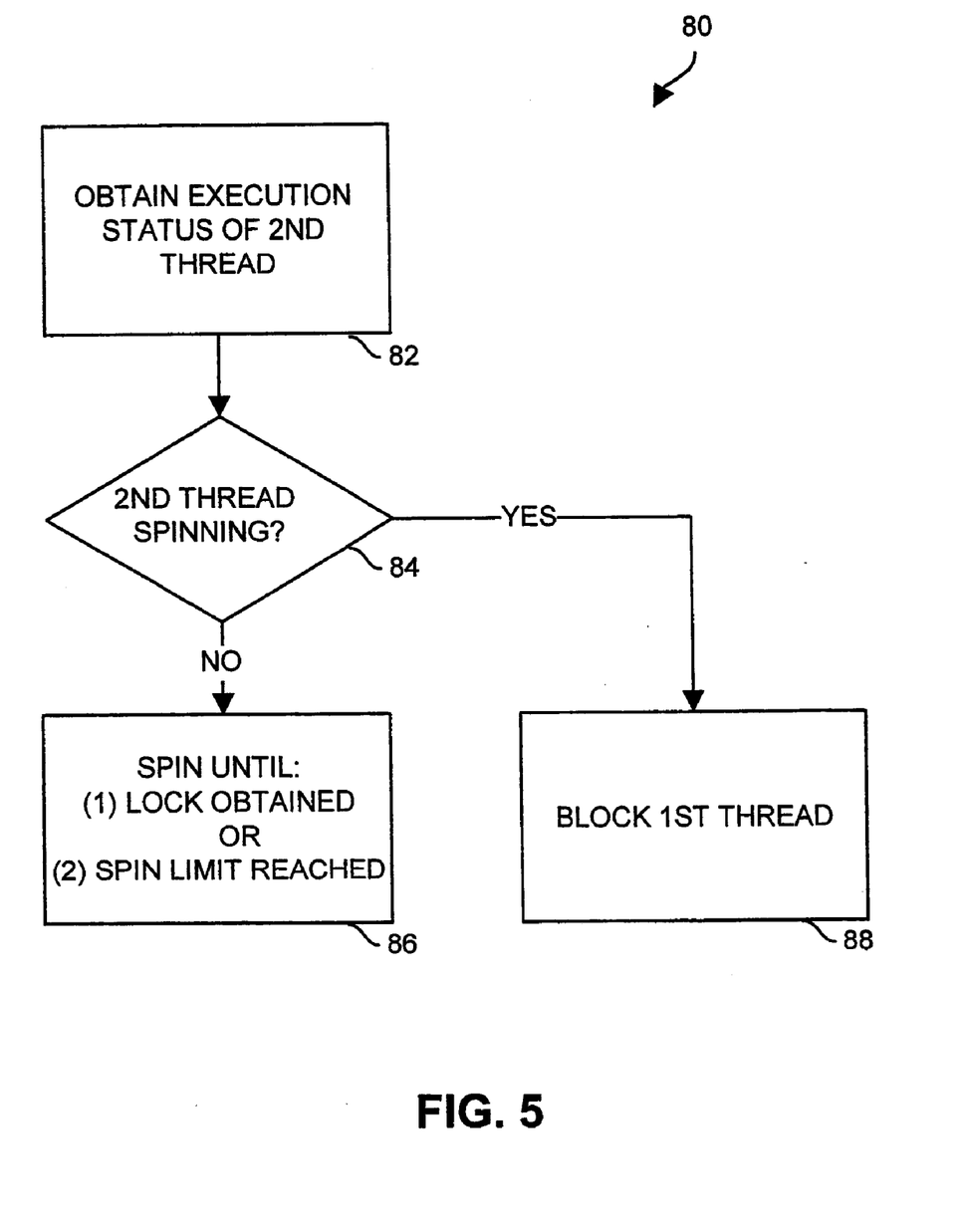

FIG. 5 shows a procedure 80 that is similar to the procedure 70 of FIG. 4 for coordinating access to the shared resource 26. Steps 82, 86 and 88 are similar to their counterpart steps 72, 76 and 78 of FIG. 4. The difference lies in step 84, in which it is determined whether the 2nd thread 38 is spinning in an attempt to acquire another lock. It will be appreciated that such a situation is similar to the blocking situation of concern in the procedure 70 of FIG. 4—the second thread 38 is not making any progress toward releasing the lock of interest to the first thread 38, and therefore it is futile for the first thread 38 to spin. Rather, it blocks and permits the processing resources to be used by other threads 38.

Figure 6:
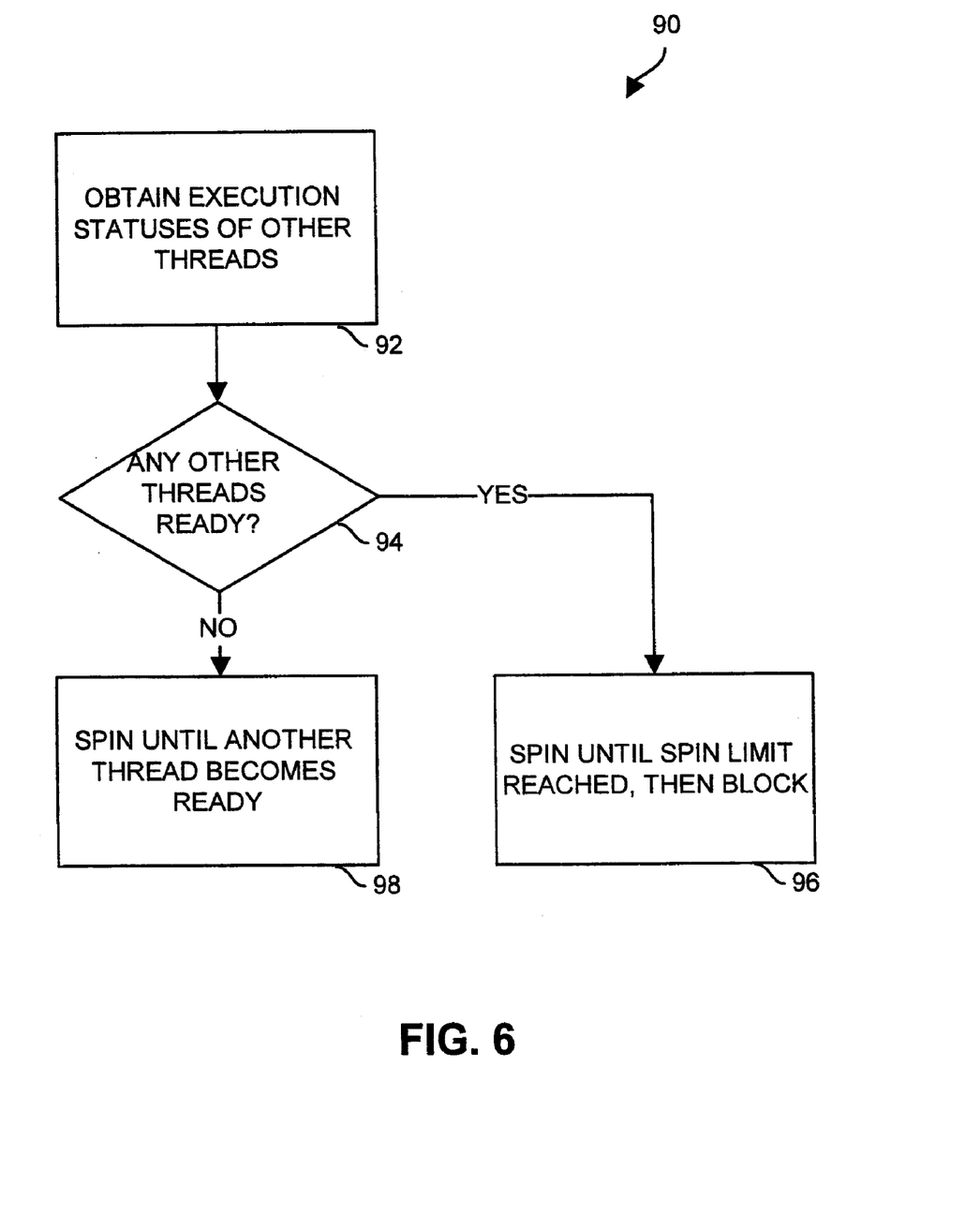

FIG. 6 shows another aspect of operation of a thread 38 pertaining to interthread synchronization in the context of coordinating access to the shared resource 26, generally identified by reference number 90. This procedure is directed to a condition in which there is no reason to impose a limit on spinning, and thus continued spinning is permitted because there is no adverse effect on system operating efficiency.

In step 92, the execution status of all threads 38 is obtained. Known mechanisms for acquiring such information include a routine known as 'getloadavg0' on Solaris and Linux systems. The Java VM also maintains such information. In particular, the information indicates whether each thread 38 in the system is in a "runnable" state, meaning that it is ready for execution and can be dispatched onto a processor.

In step 94, it is determined from the status information whether there are any other threads 38 that are ready for execution. If so, then in step 96 the thread 38 attempting to acquire the lock is permitted to spin until a predetermined spin limit is reached, such as described above with reference to FIG. 2. This gives the thread 38 a chance to acquire the lock before yielding the processor to a ready and waiting thread 38. However, if in step 94 it is determined that no other threads 38 are ready, then in step 98 the acquiring thread 38 is permitted to spin indefinitely, because even excessive spinning does not disenfranchise another thread 38. It may be desirable to periodically poll the execution statuses of the other threads 38 to determine whether any have become ready while the acquiring thread 38 is spinning, in which ease the acquiring thread 38 can be blocked and the ready thread 38 be permitted to execute.

Figure 7:
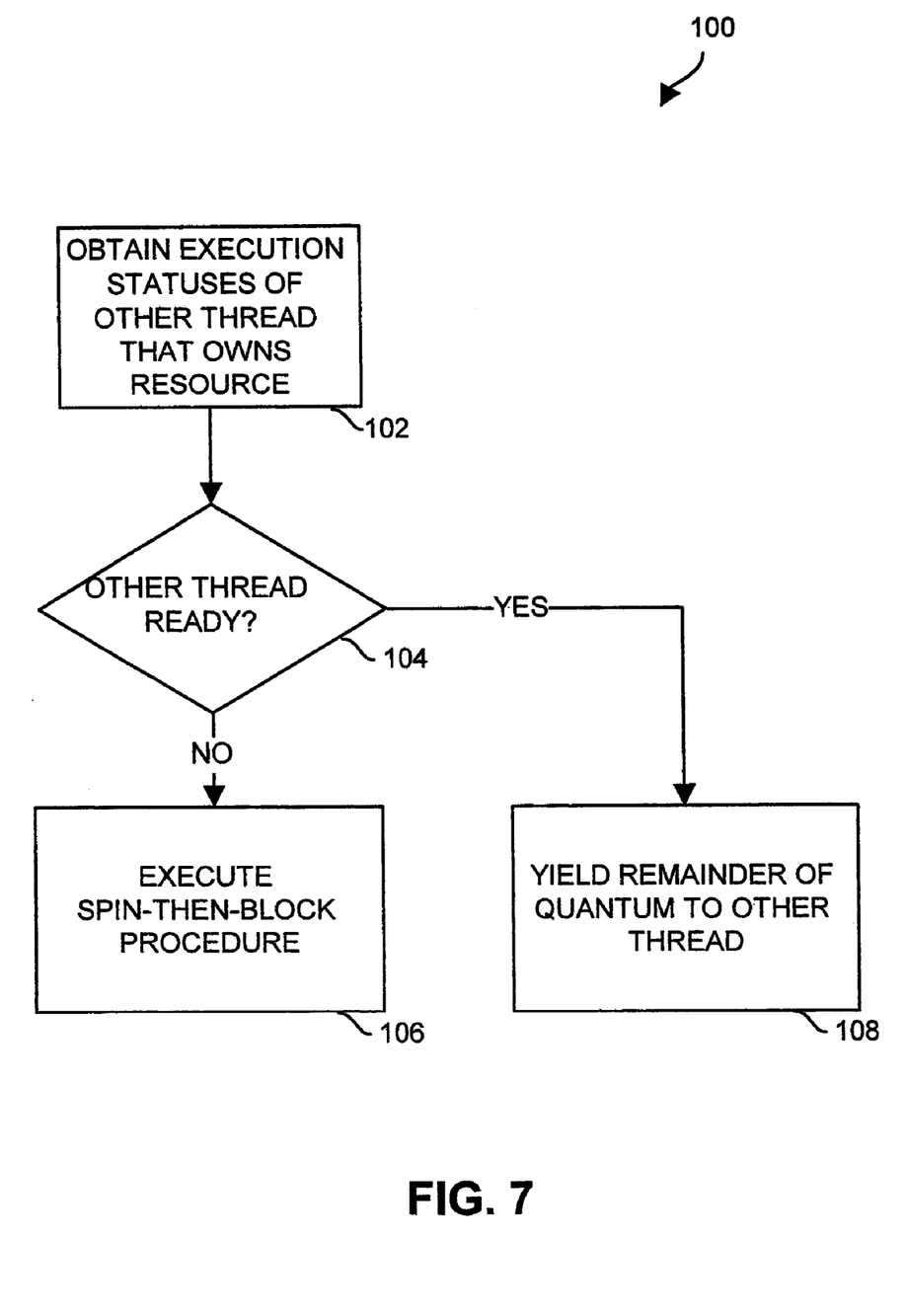

FIG. 7 shows another aspect of operation of a thread 38 pertaining to interthread synchronization in the context of coordinating access to the shared resource 26, generally identified by reference number 100. This aspect is directed to a "directed yield" operation in which an acquiring thread 38 yields processing time to the owner of a lock, to promote progress of the lock owner and thereby reduce the latency associated with acquiring the lock. The procedure 100 is generally applicable for use with preemptible threads 38 in a multi-tasking environment.

In step 102, the acquiring thread 38 obtains the execution status of the current owner of the lock, and in step 104 determines whether the current owner is in a ready state. If not (i.e., the current owner is running or blocked), then the directed yield request returns immediately with a return code indicating the non-ready status of the current owner. Then in step 106 the acquiring thread 38 executes a spin-then-block procedure for acquiring the lock, such as described above with reference to FIG. 2. However if the current owner is in a ready state, then in step 108 the acquiring thread 38 yields the remainder of its quantum of processor time to the owner. The directed yield is an operating system request, such as the Yield To request in the Java VM. After the acquiring thread 38 returns from a successful direct yield request, it should recheck the lock to ascertain whether the lock owner released the lock while it was running.

It may be advantageous, in the spin-then-block procedure of step 106, to utilize the procedure 90 of FIG. 6 to permit longer spinning where it will not adversely affect system performance. More generally, the procedure 90 of FIG. 6 can be used as an optimization in connection with various types of spin-then-block procedures.

Directed yield operations such as procedure 100 tend to keep the cache lines associated with a lock and the data protected by the lock in one processor's cache. This is desirable as cache misses and cache line migration (interprocessor sharing) have significant latency and consume memory and interconnect bandwidth. The directed yield operation brings the lock owner thread 38 into the contending thread's processor (i.e., the lock owner is dispatched onto the processor on which the yielding thread was running). That, in turn, causes the data protected by the lock (data that will normally accessed by the lock holder while it owns the critical section) to migrate into the caches associated with the contending thread's processor. Since operating system schedulers attempt to maintain some affinity between threads and processors, it is likely that the originally contending thread will again be dispatched onto the processor it was running on when it began the directed yield operation. It is likely that the cache lines containing the lock and the data protected by the lock are still resident in that processor's caches.

The disclosed techniques for avoiding unnecessary spinning may operate synergistically with techniques that are used to suppress or throttle "futile" wake-ups of blocked threads 38. The following scenario illustrates the futile wake-up problem.

1. Thread 1 acquires lock A
2. Thread 2 attempts to acquire lock A. Thread 2 fails to acquire A, so it adds itself to A's list of blocked threads and blocks itself.
3. Similarly, threads 3 and 4 attempt to acquire lock A and fail. Each thread enqueues it self and blocks itself A's list of blocked threads is now {2, 3, 4}.
4. Thread 1 unlocks A. The unlock operation needs to wake a thread, so it wakes thread 2 by dequeueing thread 2 and making it ready. The kernel's short term scheduler adds thread 2 to the list of ready threads. A's list of blocked threads is {3, 4} and the ready list contains at least {2}
5. Thread 1 loops and immediately reacquires lock A.
6. Thread 1 again unlocks A. The unlock operation dequeues thread 3 and makes it ready. A's block list is now {4} and the ready list is {2, 3}
7. Thread 1 again loops and immediately reacquires lock A.
8. Thread 1 then unlocks A again. The unlock operation dequeues thread 4 and makes it ready. A's block list is now empty and the ready list is {2, 3, 4}.
9. At this point one of two things might happen. Thread 1 can (eventually) preempted while holding lock A, or while it doesn't hold lock A. If thread 1 is preempted while holding lock A, the following can occur.
10. The kernel preempts thread 1, moving it to the ready list and picking another thread, say thread 2, from the ready list. Thread 2 is made to run, and the ready list contains {3, 4, 1}
11. Thread 2 then attempts to reacquire the lock held by 1, but fails. Thread 2 reenqueues itself and re-blocks. The act of blocking causes the kernel scheduler to reschedule and dispatch a new thread from the ready list. If the scheduler picks thread 3, then thread 3 begins running, and the ready list contains {4, 1} and A's block list contains {2}.

12. The same re-acquisition failure and re-dispatching occur for threads 3 and 4, after which the kernel picks thread 1 to run. At this point, thread 1 is running, the ready list is empty, and A's block list contains {3, 2, 4}. The system is back to exactly the same point as at step #10. No useful work has been accomplished since step #10, and all the context switching has loaded the caches with data that won't be used in the near future. In particular, all the threads migrated from A's block list to the ready queue, and then back to A's block list without any work being completed. This is clearly wasteful of processing resources.

As a remedy to the above futile wake-up scenario, a "successor" flag is utilized, which is a per-lock variable that is set if and only if a successor has been made ready by an unlocking thread, but has not yet been dispatched by the kernel's scheduler (that is, the thread is "ready", but has not yet run). A thread executing the unlock procedure checks the successor flag. If the flag is set, there is no need to wake a successor. If the 15 flag is not set, the unlocking thread picks a successor from the lock's list of blocked threads, sets the lock's successor flag, and wakes the thread, making it runnable (ready). When the successor thread eventually runs, it clears the successor flag.

When the above scenario occurs with the use of a successor flag, things happen a bit differently. It is assumed that the successor flag is initially false. At step 4, thread 20 1 dequeues thread 2, sets the successor flag to true, and wakes thread 2. Thread 2 goes to the ready queue.

At steps 6 and 8, the unlock operation notices that the successor flag is set and avoids dequeuing and waking any thread. Then, at step 10, the ready list contains only {2}, and the blocked list still contains {3, 4}. Threads 3 and 4 will not be awakened as long as thread 2 remains ready. As a result, much of the unnecessary queue movement and context switching is avoided. A fuller description of futile wakeup throttling can be found in a paper given at USENIX Proceedings of Java Virtual Machine Research and Technology Symposium in April, 2001 (JVM'01), a copy of which can be found at:

http://www.usenix.org/events/jvm01/full_papers/dice/dice.pdf

The per-lock successor flag used for futile wake-up throttling can also be used to improve spinning efficiency. When a contending thread finds that the successor flag is set, indicating that a successor has been chosen and is ready, it may be profitable to avoid spinning. The successor will become ready in a short time and itself compete for the lock. Thus it may be more efficient for the contending thread to simply block.

Additionally, a spinning thread might set the successor flag while it spins. When the lock owner releases the lock, the tmlock operation finds the successor field to be non-NULL and avoids waking another successor.

The successor flag could be implemented as a simple Boolean flag, a unique identifier identifying the successor or spinner thread, or a counter incremented and decremented with atomic operations to avoid races. In the case of a counter, the count would indicate the total number of successors and spinners.

In C code, a spin loop in the lock operator might have the following form:

```
Lock (mutex_t * m, Thread * Self)
{
//Spin-then-block
if (m->Owner --- NULL)
```

```
for (s = SpinLimit;- -s >=0 ; )
if (m->successor ~ NULL) m->successor = Self
if (m->Owner ~ NULL && CAS (&m->Owner, NULL, Self)
= NULL)
}
}
break ;
}
}
if (m->successor ~--- Self) m->Successor = NULL
if(m->Owner ~ Self)
remm ;
... block
```

The Unlock procedure would contain code of the following form:

```
m->Owner = NULL
MEMORYBARRIER
if (re->Successor != NULL[I re->Owner= = NULLr)e turn
w = PickAndDequeueSuccessor0 ;
if (w = NULL) {
m->Successor = w ;
Wakeup(w)
}
```

In the various specific techniques described above, the threads 38 can have a "priority" attribute, such that higher priority threads 38 are expected to receive more processor cycles per unit time than lower priority threads 38. Typically, priority is implemented in the operating system scheduler, but thread priority can also be applied to spinning—higher priority threads 38 might be permitted to spin longer than lower priority threads 38. Such priority-weighted spinning might be implemented by setting the maximum spin count for a given thread to S=SPIN_LIMIT (P*F), where SPIN_LIMIT the number of iterations that matches a context switch operation as described above, P is the thread's priority, and F is a priority weighting factor. Likewise, if a spinning thread 38 observes the owner field of a lock transition to NULL, the thread 38 might introduce a brief delay before executing the test-and-set instruction. If the thread's priority is high, a small (or zero) delay is used, and lower priority threads use longer delays. This delay allows other higher-priority threads 38 an opportunity to acquire the lock before lower priority threads 38.

As an additional feature, it may be desirable to track the number of threads 38 that are spinning, either on a per-lock basis or more broadly (e.g., on a per-JVM basis). If this number exceeds a predetermined limit, such as for example a number equal to the 30 number of processors in a multiprocessor system, threads 38 that subsequently contend for the lock (or for any lock when broader tracking is employed) should avoid spinning and immediately block.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A computer-implemented method of acquiring ownership of a shared resource in a multi-threaded computing environment, comprising:
   for each set of multiple sets of N successive attempts by a first thread acquire ownership of the shared resource:
   for each of a predetermined number of the N attempts of the set, executing a spin procedure during which the first thread repeatedly determines whether the shared resource is owned by another thread, the spin procedure terminating upon the earlier of (i) successfully obtaining ownership of the shared resource, or (ii) reaching a predetermined execution time limit; and for a remainder of the N attempts of the set, determining whether the shared resource is owned by the another thread, and if so then executing a blocking procedure which temporarily suspends execution of the first thread;
   periodically adjusting the value of N based on the extent to which at least one recent execution of the spin procedure has terminated successfully; and
   measuring the duration of a context switching operation within the computing environment, and wherein the predetermined execution time limit is made substantially equal to the measured duration of the context switching operation.

2. A computer-implemented method according to claim 1, wherein (i) the value of N is decreased if it is greater than a minimum permissible value and the most recent execution of the spin procedure has terminated successfully, and (ii) the value of N increased if it is less than a maximum permissible value and the most recent execution of the spin procedure has not terminated successfully.

3. A computer-implemented method according to claim 1, wherein the predetermined number of attempts in which the spin procedure is executed for each set is one.

4. A computer-implemented method according to claim 1, further comprising:
   in connection with the execution of the spin procedure, determining whether the respective execution statuses of other threads indicate that any of the other threads is ready to be executed;
   if respective execution statuses of the other threads indicate that any of the other threads is ready to be executed, then limiting the duration of the spin procedure to the predetermined execution time limit before executing the blocking procedure; and if the respective execution statuses of the other threads indicate that none of the other threads is ready to be executed, then permitting the spin procedure to execute beyond the predetermined execution time limit.

5. A computer-implemented method according to claim 1, further comprising:
   prior to the execution of the spin procedure, determining whether a successor flag is set to a non-null value, the non-null value of the successor flag indicating that at least one other thread waiting to acquire ownership of the shared resource is ready for execution; and if the successor flag is set to the non-null value, then executing the blocking procedure instead of the spin procedure.

6. A computer-implemented method according to claim 1, wherein multiple threads of the multi-threaded computing environment have respective priorities, and further comprising adjusting the predetermined execution time limit on a per-thread basis such that higher-priority threads have a longer execution time limit than lower-priority threads.

7. A computer-implemented method according to claim 1, wherein multiple threads of the multi-threaded computing environment have respective priorities, and further comprising adjusting respective periods of delay in respective spin loops of the threads, each period of delay starting when a respective thread observes a transition of the ownership of the shared resource and ending when the respective thread executes a test- and-set instruction in an attempt to acquire ownership of the shared resource, the periods of delay being adjusted such that lower-priority threads have delay periods greater than the delay periods of higher-priority threads.

8. A computer program product that includes a computer readable storage medium having instructions stored thereon for accessing a shared resource of a computerized system, such that the instructions, when carried out by the computerized system, cause the computerized system to:
   (1) for each set of multiple sets of N successive attempts by a first thread to acquire ownership of the shared resource:
   for each of a predetermined number of the N attempts of the set, less than N, execute a spin procedure during which the first thread repeatedly determines whether the shared resource is owned by the another thread, the spin procedure terminating upon the earlier of (i) successfully obtaining ownership of the shared resource, and (ii) reaching a predetermined execution time limit; and
   for a non-zero remainder of the N attempts of the set, determine whether the shared resource is owned by another thread, and if so then executing a blocking procedure which temporarily suspends execution of the first thread; and
   (2) periodically adjust the value of N based on the extent to which at least one recent execution of the spin procedure has terminated successfully.

9. A computer program product according to claim 8, wherein the predetermined number of attempts in which the spin procedure is executed for each set is one.

10. A computer program product according to claim 8, wherein, when the instructions are carried out by the computerized system, the computerized system is further caused to:
   prior to the execution of the spin procedure, determine whether a successor flag is set to a non-null value, the non-null value of the successor flag indicating that at least one other thread waiting to acquire ownership of the shared resource is ready for execution; and
   if the successor flag is set to the non-null value, execute the blocking procedure instead of the spin procedure.

11. A computerized system, comprising:
   a shared resource; and
   control circuitry including a set of one or more processors operative to execute a mutual exclusion mechanism, the mutual exclusion mechanism including a computer-implemented method of acquiring ownership of the shared resource, the method including:
   (1) for each set of multiple sets of N successive attempts by a first thread to acquire ownership of the shared resource:
   for each of a predetermined number of the N attempts of the set less than N, executing a spin procedure during which the first thread repeatedly determines whether the shared resource is owned by another thread, the spin procedure terminating upon the earlier of (i) successfully obtaining ownership of the shared resource, and (ii) reaching a predetermined execution time limit; and for the non-zero remainder of a N attempts of the set, determining whether the shared resource is owned by the another thread, and if so then executing a blocking procedure which temporarily suspends execution of the first thread; and (2) periodically adjusting the value of N based on the extent to which least one recent execution of the spin procedure has terminated successfully.

12. The computerized system according to claim 11, wherein (i) the value of N is decreased if it is greater than a minimum permissible value and the most recent execution of the spin procedure has terminated successfully, and (ii) the value of N increased if it is less than a maximum permissible value and the most recent execution of the spin procedure has not terminated successfully.

13. The computerized system according to claim 11, wherein the predetermined number of attempts in which the spin procedure is executed for each set is one.

14. The computerized system according to claim 11, further comprising:
   prior to the execution of the spin procedure, determining whether a successor flag is set to a non-null value, the non-null value of the successor flag indicating that at least one other thread waiting to acquire ownership of the shared resource is ready for execution; and
   if the successor flag is set to the non-null value, then executing the blocking procedure instead of the spin procedure.

15. A computerized system including at least a central processor running a multi-threaded computing environment in which a first thread acquires ownership of a shared resource from another thread, comprising:
   means, executed by the processor, for executing a spin procedure for each of a predetermined number M of N attempts to acquire ownership of the shared resource, the spin procedure repeatedly determining whether the shared resource is owned by another thread, the spin procedure terminating upon the earlier of (i) successfully obtaining ownership of the shared resource, and (ii) reaching a predetermined execution time limit;
   means, executed by the processor, for determining, for a non-zero remainder of the N-M attempts, whether the shared resource is owned by the another thread, and if so then executing a blocking procedure which temporarily suspends execution of the first thread;
   means, executed by the processor, for repeating the execution of the spin procedure and the blocking procedure for subsequent sets of N attempts to acquire ownership of the shared resource; and
   means, executed by the processor, for periodically adjusting the value of N based on the extent to which at least one recent execution of the spin procedure has terminated successfully.

16. The computerized system according to claim 15, wherein (i) the value of N is decreased if it is greater than a minimum permissible value and the most recent execution of the spin procedure has terminated successfully, and (ii) the value of N increased if it is less than a maximum permissible value and the most recent execution of the spin procedure has not terminated successfully.

17. The computerized system according to claim 15, wherein the predetermined number of attempts in which the spin procedure is executed for each set is one.

18. The computerized system according to claim 15, further comprising:
   prior to the execution of the spin procedure, determining whether a successor flag is set to a non-null value, the non-null value of the successor flag indicating that at least one other thread waiting to acquire ownership of the shared resource is ready for execution; and
   if the successor flag is set to the non-null value, then executing the blocking procedure instead of the spin procedure.

19. A computer program product according to claim 8, wherein (i) the value of N is decreased if it is greater than a minimum permissible value and the most recent execution of the spin procedure has terminated successfully, and (ii) the value of N increased if it is less than a maximum permissible value and the most recent execution of the spin procedure has not terminated successfully.

* * * * *